(12) United States Patent
Connally et al.

(10) Patent No.: US 7,676,347 B2
(45) Date of Patent: Mar. 9, 2010

(54) SYSTEMS AND METHODS FOR ACCUMULATION OF SUMMARIES OF TEST DATA

(75) Inventors: Carli Connally, Fort Collins, CO (US); Reid Hayhow, LaPorte, CO (US); Bryan F. Carpenter, Loveland, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 973 days.

(21) Appl. No.: 11/345,198

(22) Filed: Jan. 31, 2006

(65) Prior Publication Data

US 2007/0180321 A1    Aug. 2, 2007

(51) Int. Cl.
   *G06F 17/50*    (2006.01)
   *G06F 9/44*     (2006.01)
(52) U.S. Cl. .................... 703/2; 703/14; 715/234; 707/100
(58) Field of Classification Search .............. 703/2, 703/14; 705/7; 715/234; 382/293; 707/100
   See application file for complete search history.

(56) References Cited

U.S. PATENT DOCUMENTS

| 6,763,148 B1* | 7/2004 | Sternberg et al. ............ 382/293 |
| 7,278,096 B2* | 10/2007 | Sulistio et al. .............. 715/234 |
| 2006/0156224 A1* | 7/2006 | Sulistio et al. .............. 715/513 |
| 2007/0094060 A1* | 4/2007 | Apps et al. ..................... 705/7 |

\* cited by examiner

*Primary Examiner*—Thai Phan
(74) *Attorney, Agent, or Firm*—Holland & Hart, LLP

(57) ABSTRACT

In one embodiment, there is disclosed a system for accumulation of summaries of test data. The system includes a data populator having code to: (1) generate data objects from the test data and store the data objects in a data model, (2) arrange the data objects in a tree structure, (3) generate summaries of the test data, (4) store the summaries of the test data in the tree structure, and (5) delete the data objects. The system also includes a number of clients in communication with the data model, the clients having code to: (1) selectively read the test data from the data objects stored in the data model, and (2) read the summaries of the test data stored in the tree structure. Other embodiments are also disclosed.

17 Claims, 15 Drawing Sheets

SYSTEMS AND METHODS FOR ACCUMULATION OF SUMMARIES OF TEST DATA

BACKGROUND

Test data generated by automatic test equipment is typically provided to clients that format and/or analyze the data. When more than one client needs to access the test data, the demands of storing the data can become excessive.

SUMMARY OF THE INVENTION

In one embodiment, a system for accumulation of summaries of test data comprises a data populator having code to: (1) generate data objects from the test data and store the data objects in a data model, (2) arrange the data objects in a tree structure, (3) generate summaries of the test data, (4) store the summaries of the test data in the tree structure, and (5) delete the data objects. The system also comprises a number of clients in communication with the data model, the clients having code to: (1) selectively read the test data from the data objects stored in the data model, and (2) read the summaries of the test data stored in the tree structure.

In another embodiment, a system for accumulation of summaries of test data comprises: a data populator having code to: (1) generate data objects from the test data and store the data objects in a data model, and (2) arrange the data objects in a relational structure; a number of clients in communication with the data model, the clients having code to selectively read the test data from the data objects stored in the data model; and code to generate summaries of the test data.

In yet another embodiment, a method of accumulating summaries of test data comprises: generating data objects from the test data; storing the data objects in a data model; generating summaries of the test data; and storing the summaries of the test data in the data model.

In still another embodiment, a method of accumulating summaries of test data comprises: generating data objects from the test data; arranging the data objects in a tree structure; storing the data objects arranged in the tree structure in a data model; selectively reading the test data from the data objects stored in the data model, via a number of clients that are in communication with the data model; generating summaries of the test data; and storing the summaries of the test data in parent objects of the data objects to which it pertains.

Other embodiments are also disclosed.

BRIEF DESCRIPTION OF THE DRAWINGS

Illustrative embodiments of the invention are illustrated in the drawings, in which.

DETAILED DESCRIPTION

Figure 1:
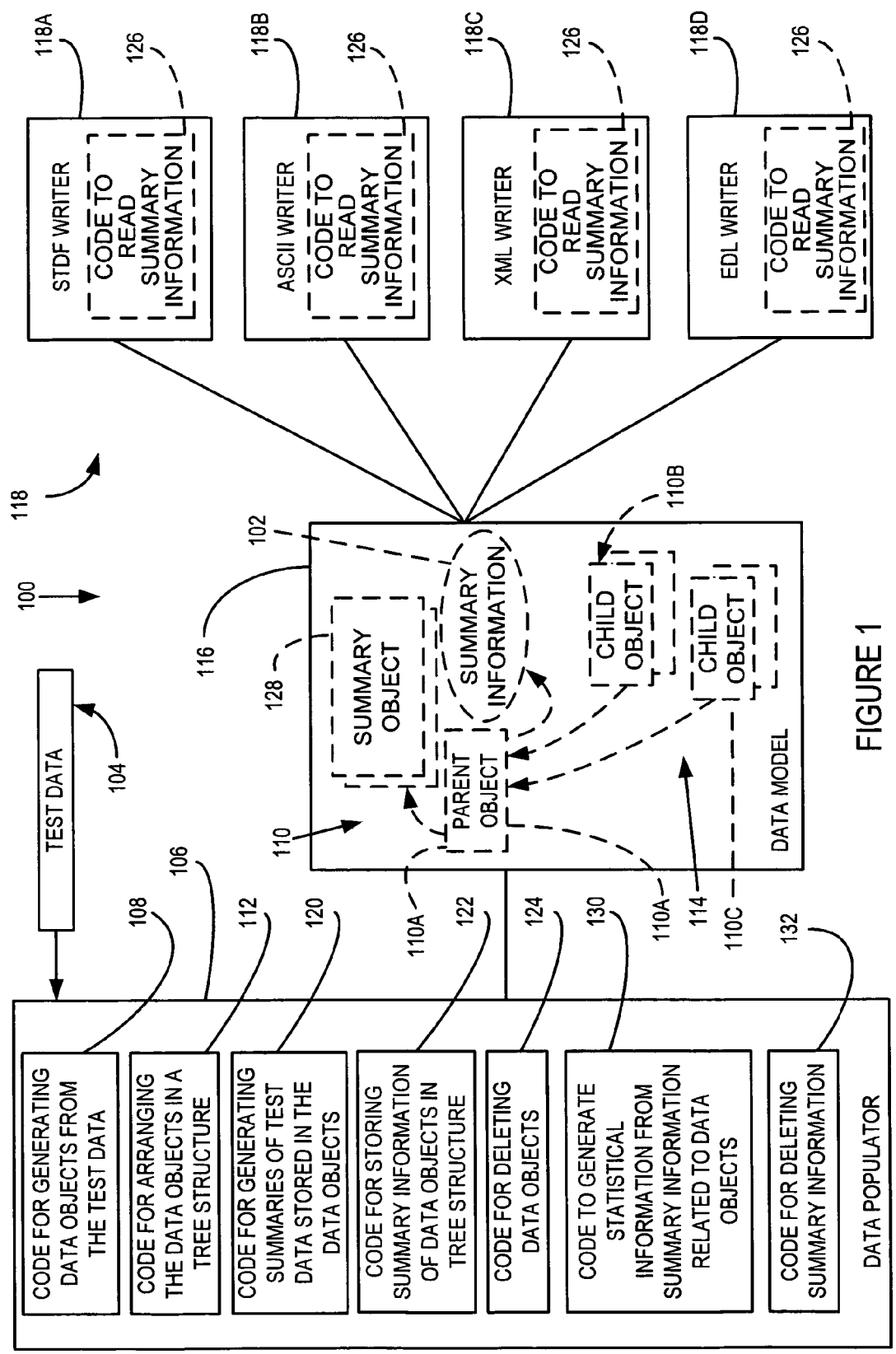
FIG. 1 illustrates a system for accumulation of summaries of test data.

Looking at FIG. 1, there is shown a system 100 for accumulation of summaries 102 of test data 104. In one embodiment, system 100 may comprise a data populator 106 having code 108 for generating data objects 110 from test data 104. System 100 may also comprise code 112 for arranging data objects 110 in a tree structure 114.

In one embodiment, there is provided a data model 116 in communication with data populator 106. Data model 116 may store data objects 110 arranged in tree structure 114.

Referring still to FIG. 1, and in one embodiment, a number of clients 118 (i.e., one or more) may be in communication with data model 116. As needed for writing data files, clients 118 may selectively read test data from the data objects 110 stored in data model 116.

In one embodiment, data populator 106 may include code 120 for generating summaries 102 of the test data stored in the data objects 110. Data populator 106 may further include code 122 for storing this summary information 102 in tree structure 114. Data populator 106 may also include code 124 for deleting data objects 110. In one embodiment, clients 118 have code 126 to read the summary information 102 stored in the tree structure 114.

In one embodiment, a summary data object 128 may be generated by data populator 106. Summary information 102 may then be stored within the summary data object 128. In another embodiment, a plurality of summary data objects 128 may be generated by the data populator 106. Summary information 102 may then be stored within the plurality of summary data objects 128.

In one embodiment, summary information 102 may include statistical information.

Referring still to FIG. 1, and in one embodiment, the plurality of clients 118 may include data formatters. The data formatters may include, but are not limited to, an STDF writer 118A, an ASCII writer 118B, an XML writer 118C and/or an EDL writer 118D.

In one embodiment, code 122 for storing summary information 102 of data objects 110B, 110C places summary information 102 thereof in a parent object 110A of the data objects to which it pertains. In another embodiment, there is provided code for storing summaries of data objects from child objects to parent objects located in adjacent ones of data objects. In one embodiment, code 122 for storing summary information 102 of data objects 110B, 110C places summary information 102 thereof in one or more parent objects 128 located at least one object away from adjacent ones of data objects 110B, 110C (i.e., in grandparent objects).

In another embodiment, code 122 for storing summary information 102 of data objects 110B, 110C places the summary information 102 in at least one of the data objects 128 that is created from test data by the data populator 106.

In one embodiment, code 122 for storing summary information 102 of data objects 110 may aggregate summary information 102 for multiple ones of data objects 110.

In one embodiment, data populator 106 may include code 124 to delete data objects 110 prior to completion of the summary information 102, and prior to the summary information 102 being read by some or all of the clients 118.

In one embodiment, data populator 106 may include code 132 for deleting summary information 102. In one embodiment, code 132 for deleting summary information 102 may delete summary object 128. Generally, code 132 may delete summary information 102 subsequent to clients 118 reading all objects 110 related to the summary information 102. In another embodiment, code 132 may be configured to delete summary information 102 after parent object 110A has been deleted.

In another embodiment, the system 100 for accumulation of summary information 102 of test data 104 includes data populator 106, data model 116, and a plurality of clients 118.

Data populator 106 may have code 108 for generating data objects 110 from test data 104. Furthermore, data populator 106 may have code 112 for arranging data objects 110 in a relational structure 114.

Data model 116 may be in communication with data populator 106. Generally, data model 116 stores data objects 110 arranged in relational structure 114. The plurality of clients 118 may be in communication with data model 116. Typically, clients 118 selectively obtain data objects 110 stored in data model 116. System 100 includes code 112 for generating summary information 102 of data objects 110.

In an embodiment, system 100 includes code 122 for storing summary information 102 of data objects 110 in relational structure 114. System 100 may include code 124 for deleting data objects 110. Furthermore, system 100 may include code 132 for deleting the summary information 102.

Generally, clients 118 may each have code 126 to read summary information 102 stored in relational structure 114. In an embodiment, clients 118 may obtain summary information 102 without the need code for code to read summary information 102.

Figure 2:
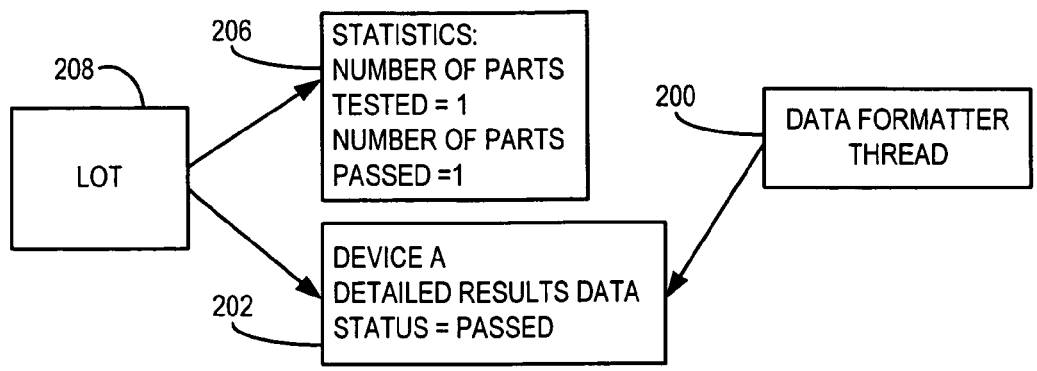
FIGS. 2-4 illustrate interaction of a data formatter thread with test data, and summaries of test data, stored within a data model.
Figure 3:
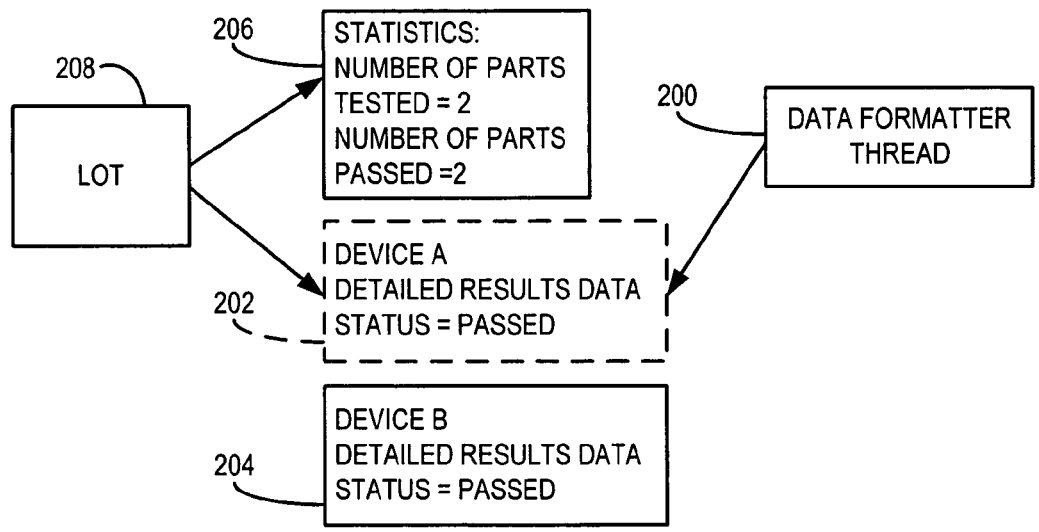
Figure 4:
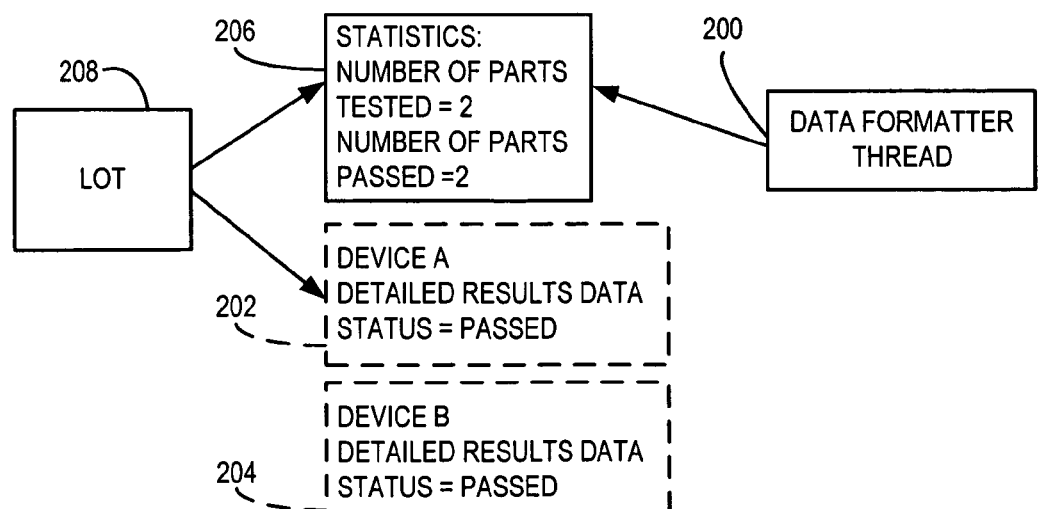

FIGS. 2-4 illustrate an interaction of a data formatter thread 200 with detailed test results 202 and 204, and summary data 206 of a lot 208 stored in a data model. Lot 208 is the parent object of child objects 202 and 204.

In FIG. 2, there is shown lot 208 with child object 202 having detailed test results for a device A. A data formatter thread 200 has a reference to the detailed results in child object 202 for device A. Data formatter thread 200 may be formatting data of child object 202 for device A to write the data of child object 202 to a file.

Referring to FIG. 3, there is shown lot 208, which represents the state of the data model after the processing for lot 200 shown in FIG. 2, has the results for two tested devices, i.e., device A and device B. Generally, a summary object 210 is created to store summaries of the tested devices. In an embodiment, after summary information 210 is written for child object 202, which has detailed test results for device A, and after data formatter thread 206 has read child object 202, it may be deleted. This applies to other data objects for other devices as soon as the data is no longer needed.

Referring to FIG. 4, there is shown data formatter thread 200 after formatting the detailed results of data object 204 for device B. As the data for device B is no longer needed, data object 204 can be deleted. Data formatter thread 200 is shown with a reference to summary object 210, which allows data thread 200 to write the summary information within summary object 210. Data formatter thread 200 can retrieve this summary information from summary object 206 after data object 202 and data object 202, which relate to device A and device B, respectively, have been deleted.

Figure 5:
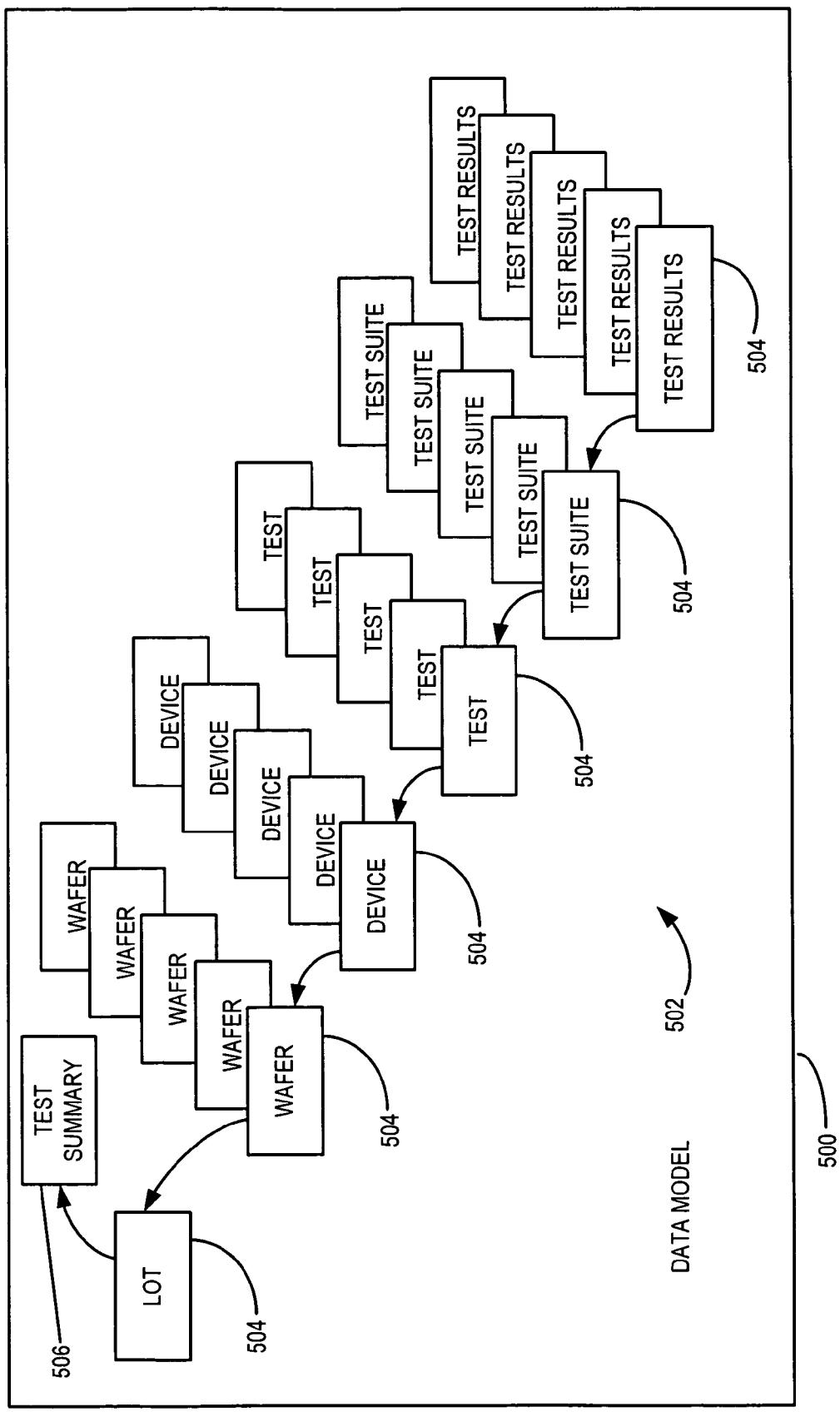
FIG. 5 illustrates a data model having a tree structure of parent and child data objects, together with a test summary data object for storing summaries of test data pertaining to the child data objects.

Looking at FIG. 5, and in one embodiment, there is shown a data model 500 having a tree structure 502 of parent and child data objects 504. In an embodiment, tree structure 502 may include a test summary data object 506 for storing summaries of test data in parent and child objects 504. Test summary data object 506 may allow retention of summary information, including statistical information, within data model 500 after deletion of parent and child objects 504. The retention of summary information by test summary data object in turn allows further access of this information by clients without storing parent and child objects 504 for long periods of time.

Figure 6:
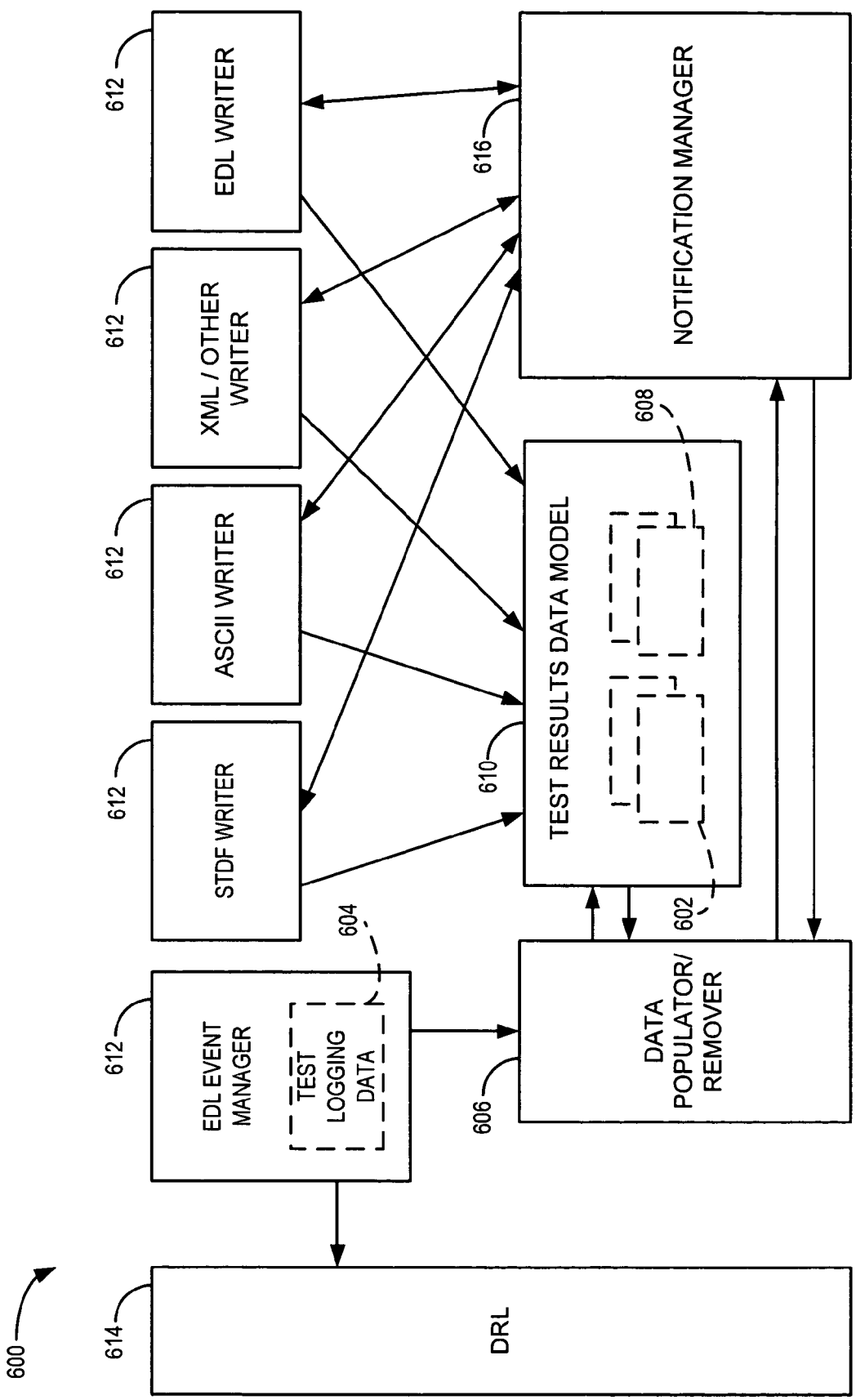
FIG. 6 illustrates another system for accumulation of summaries of test data.

Referring to FIG. 6, and in an embodiment, there is shown a system 600 for accumulation of summary information 602 of test data 604. In an embodiment, system 600 may comprise a data populator 606 for generating data objects 608 from test data 604.

In one embodiment, there is provided a data model 610 in communication with data populator 606. Data model 610 may store data objects 608. A plurality of clients 612 may be in communication with data model 610. As needed for writing data files, clients 612 may selectively read summary information 602 and data objects 608 stored in data model 610.

In one embodiment, an event data logging manager 612, which may also be referred to as EDL manager 612, may provide test data 604 into data populator 606. Furthermore, a data resource library 614, which may also be referred to as DRL 614, may provide test data 604 into EDL manager 612.

In an embodiment, a notification manager 616 may be in communication with data populator 606 and clients 612. Notification manager 616 may notify clients 612 of data objects 610 and summary information 602. Clients 612 may each in turn selectively read data objects 610 and summary information 602 stored in data model 610.

Figure 7:
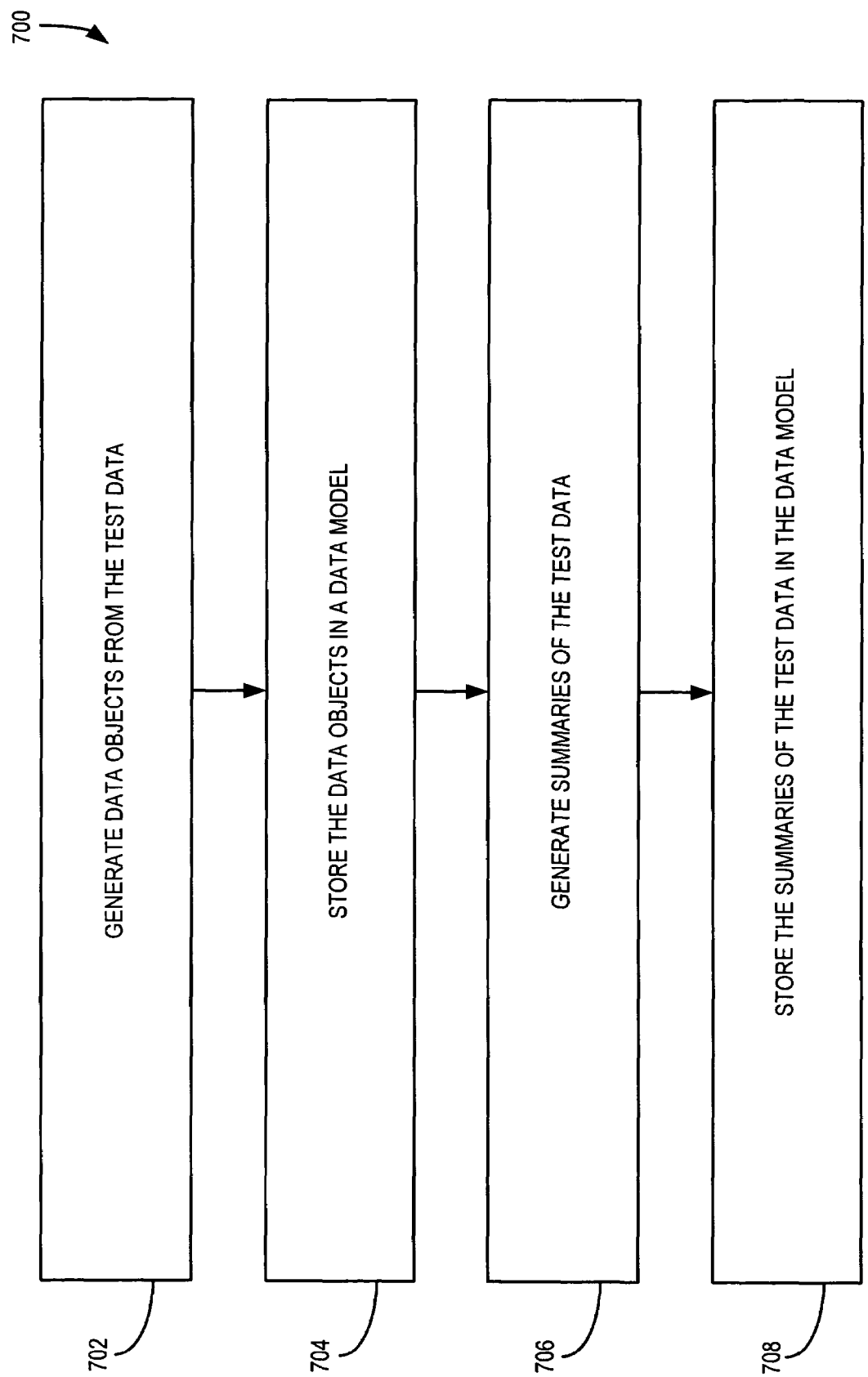
FIGS. 7-17 illustrate various methods for accumulation of summaries of test data.

Referring now to FIG. 7, there is shown a method 700 of accumulating summaries of test data. In an embodiment, method 700 may include generating 702 data objects from the test data. Method 700 may further include storing 704 the data objects in a data model. Method 700 may also include generating 706 summaries of test data. Method 700 may include storing 708 the summaries of the test data in the data model.

Figure 8:
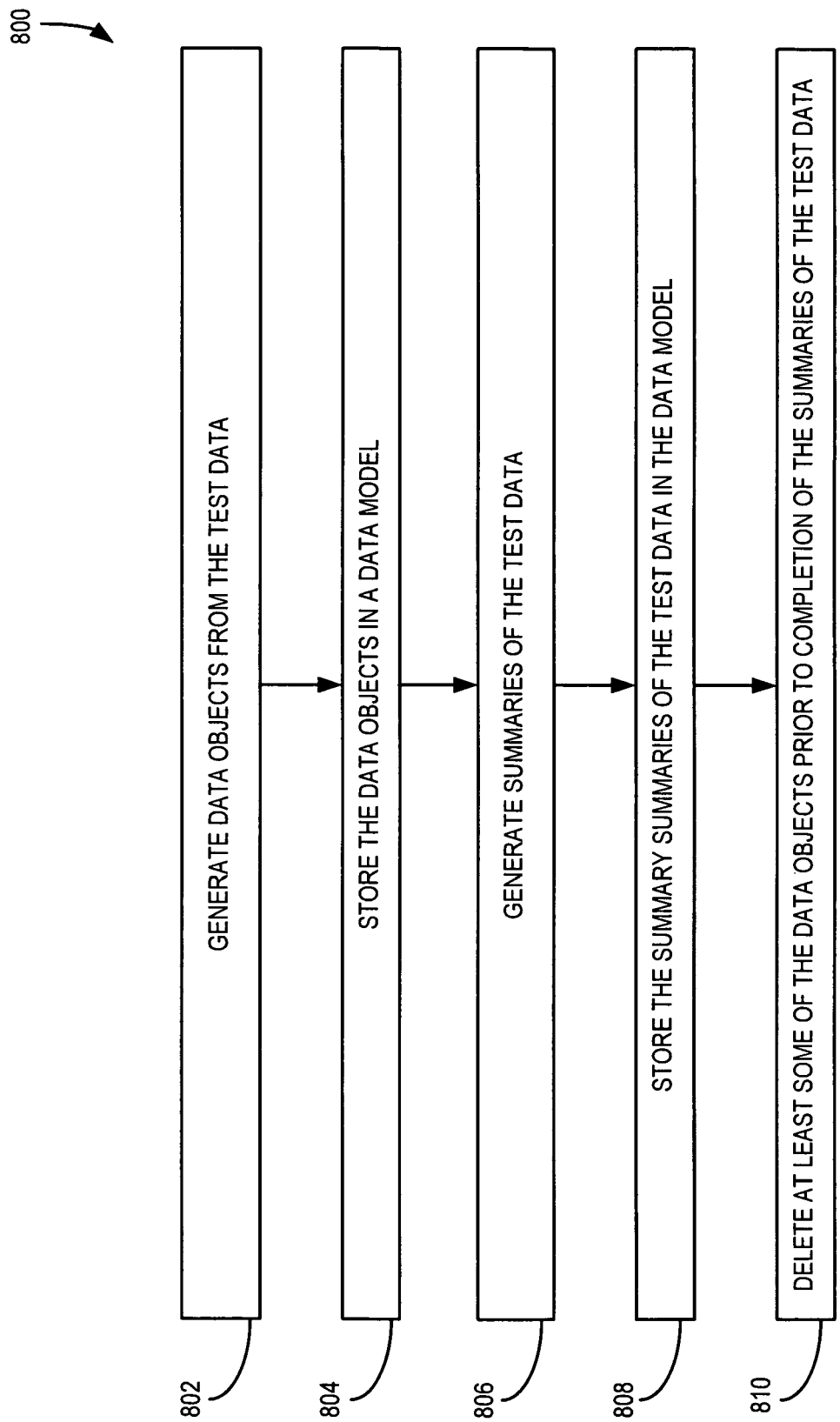

Looking at FIG. 8, there is shown a method 800 of accumulating summaries of test data. In one embodiment, method 800 may include generating 802 data objects from the test data. Method 800 may further include storing 804 the data objects in a data model. Method 800 may also include generating 806 summaries of test data. Method 800 may include storing 808 the summaries of the test data in the data model. Method 800 may include deleting 810 at least some of the data objects prior to completion of the summaries of the test data.

Figure 9:
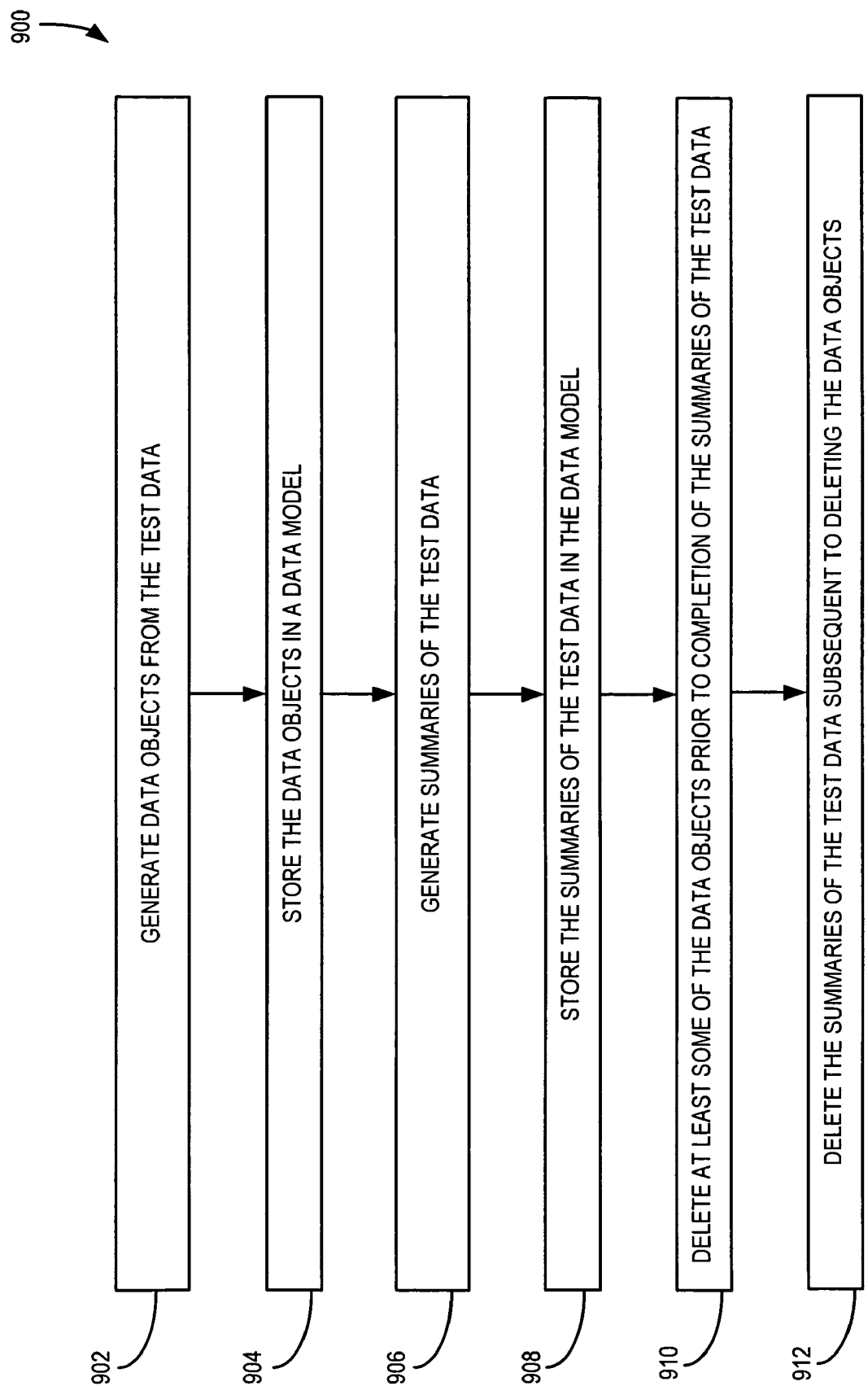

Referring to FIG. 9, there is shown a method 900 of accumulating summaries of test data. In an embodiment, method 900 may include generating 902 data objects from the test data. Method 900 may further include storing 904 the data objects in a data model. Method 900 may also include generating 906 summaries of test data. Method 900 may include storing 908 the summaries of the test data in the data model. Method 900 may include deleting 910 the data objects subsequent to the step of storing the summaries of the test data in the data model. Method 900 may include deleting 912 the summaries of the test data subsequent to deleting the data objects.

Figure 10:
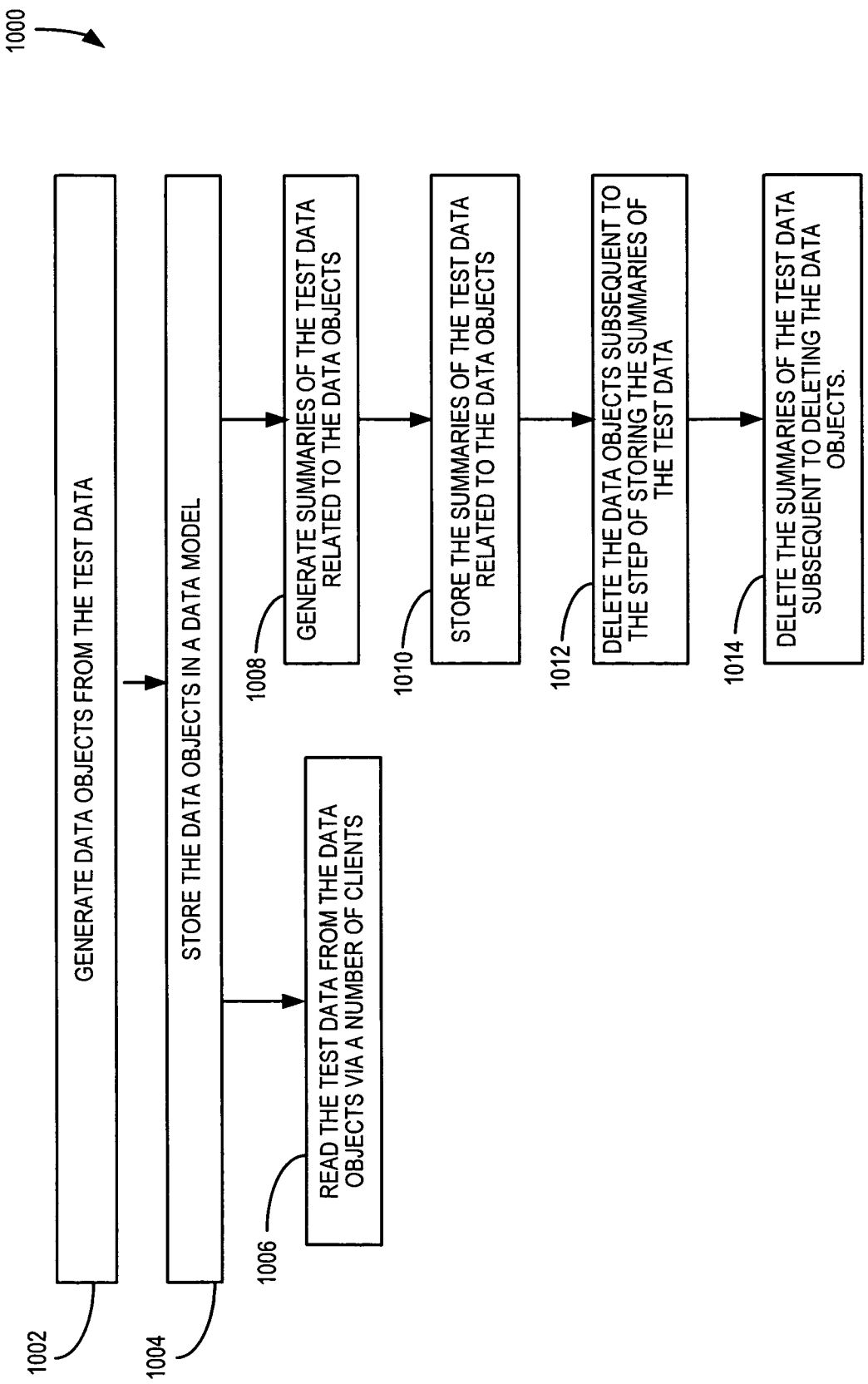

FIG. 10 illustrates a method 1000 of accumulating summaries of test data. In an embodiment, method 1000 may include generating 1002 data objects from the test data. Method 1000 may further include storing 1004 the data objects in a data model. Method 1000 may include reading 1006 the test data from the data objects via a number of clients. Method 1000 may also include generating 1008 summaries of test data. Method 1000 may include storing 1010 the summaries of the test data in the data model. Method 1000 may include deleting 1012 the data objects subsequent to the step of storing the summaries of the test data. Method 1000 may include deleting 1014 the summaries of the test data.

Figure 11:
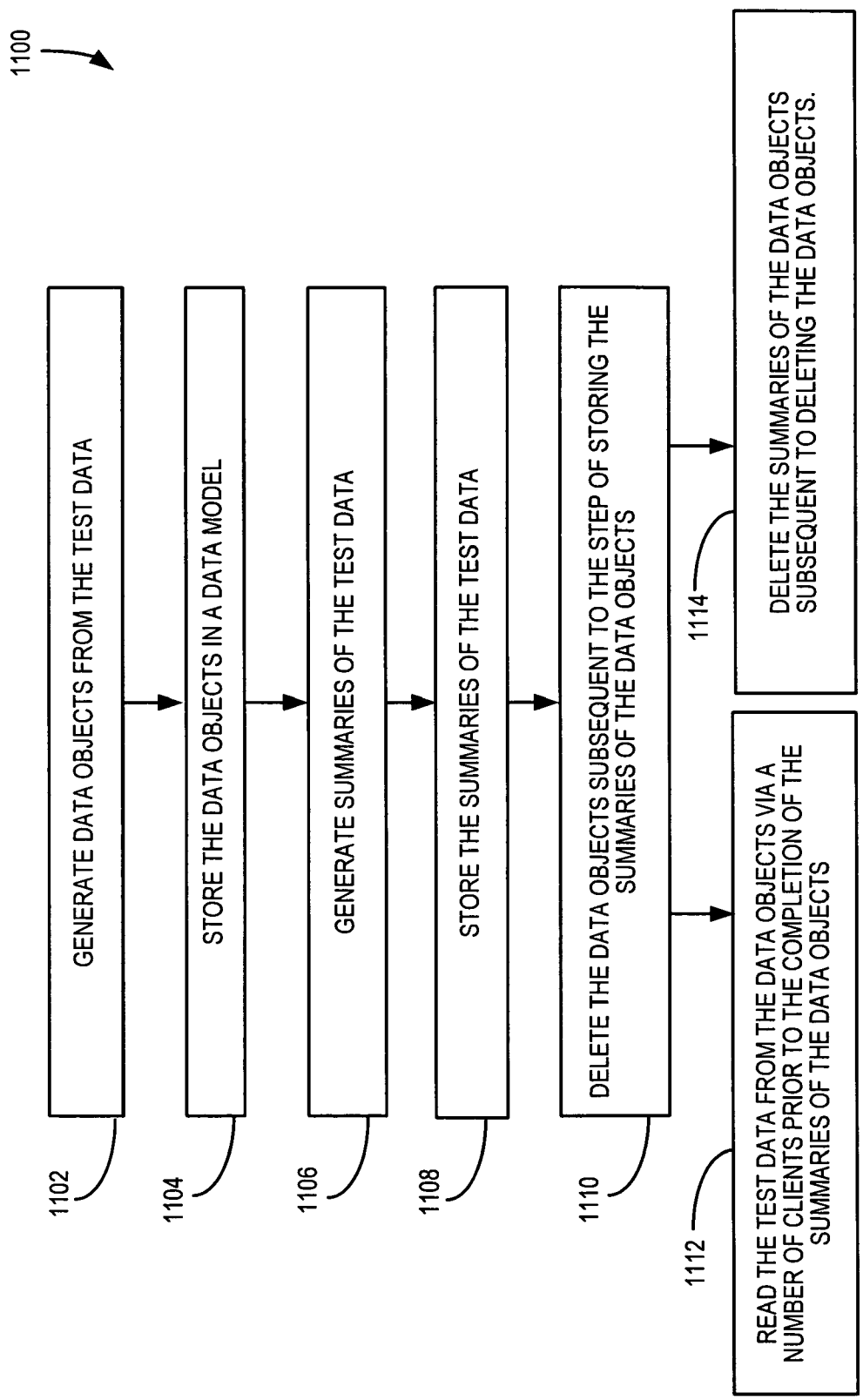

Looking now at FIG. 11, there is shown a method 1100 of accumulating summaries of test data. In an embodiment, method 1100 may include generating 1102 data objects from the test data. Method 1100 may further include storing 1104 the data objects in a data model. Method 1100 may include reading 1106 the test data from the data objects via a number of clients prior to the completion of the summaries of the data objects. Method 1100 may also include generating 1108 summaries of test data. Method 1100 may include storing 1110 the summaries of the test data. Method 1100 may include deleting 1112 the data objects subsequent to the step of storing the summaries of the test data. Method 1100 may include deleting 1114 the summaries of the test data subsequent to deleting the data objects.

Figure 12:
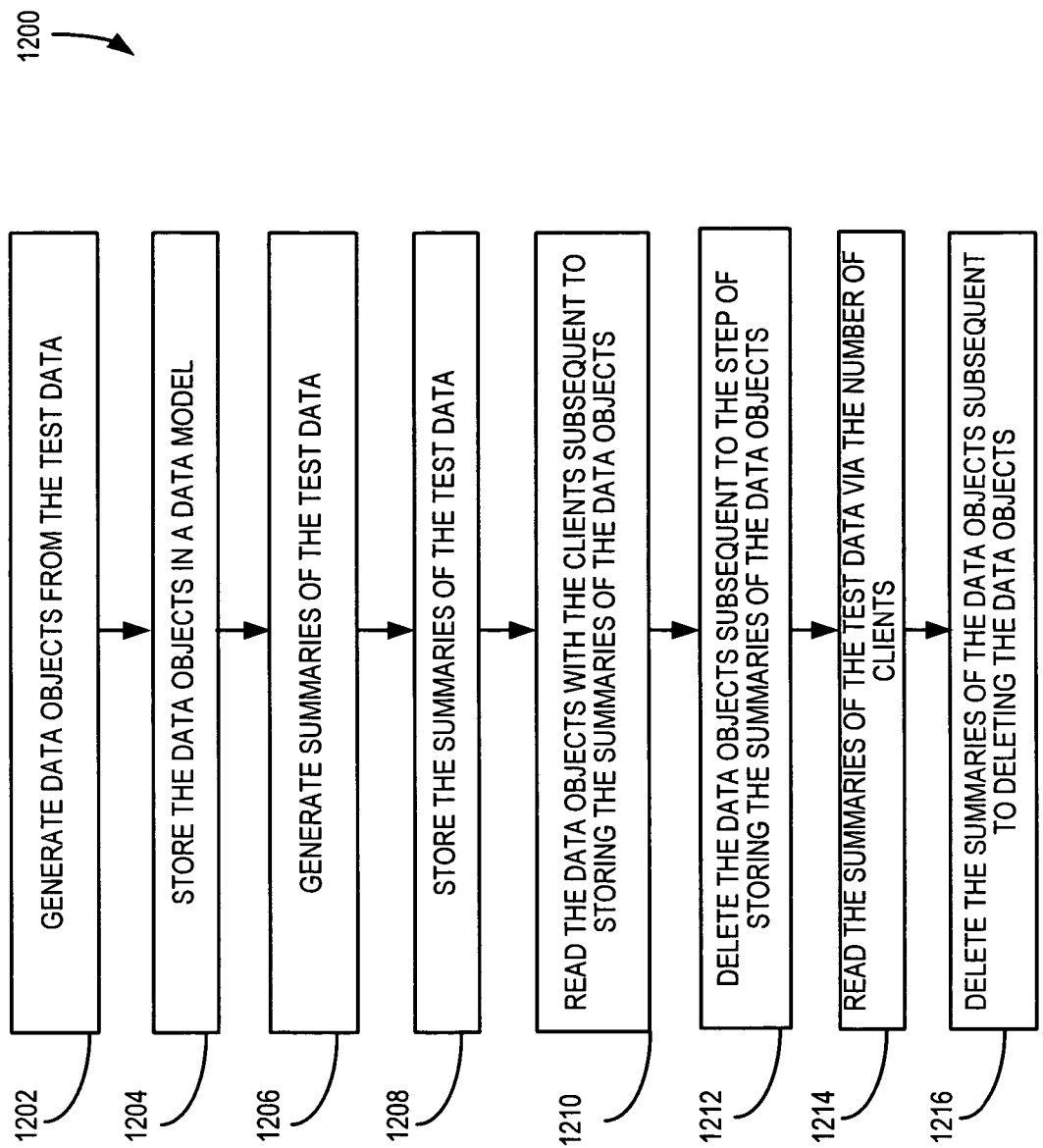

Referring to FIG. 12, there is shown a method 1200 of accumulating summaries of test data. In an embodiment, method 1200 may include generating 1202 data objects from the test data. Method 1200 may further include storing 1204 the data objects in a data model. Method 1200 may also include generating 1206 summaries of test data related to the data objects. Method 1200 may include storing 1208 the summaries of the data objects. Method 1200 may include reading 1210 the data objects with the clients subsequent to storing the summaries of the data objects. Method 1200 may include deleting 1212 the data objects subsequent to the step of storing the summaries of the test data. Method 1200 may include reading 1214 the summaries of the test data via the number of clients. Method 1200 may include deleting 1216 the summaries of the test data subsequent to deleting the data objects.

Figure 13:
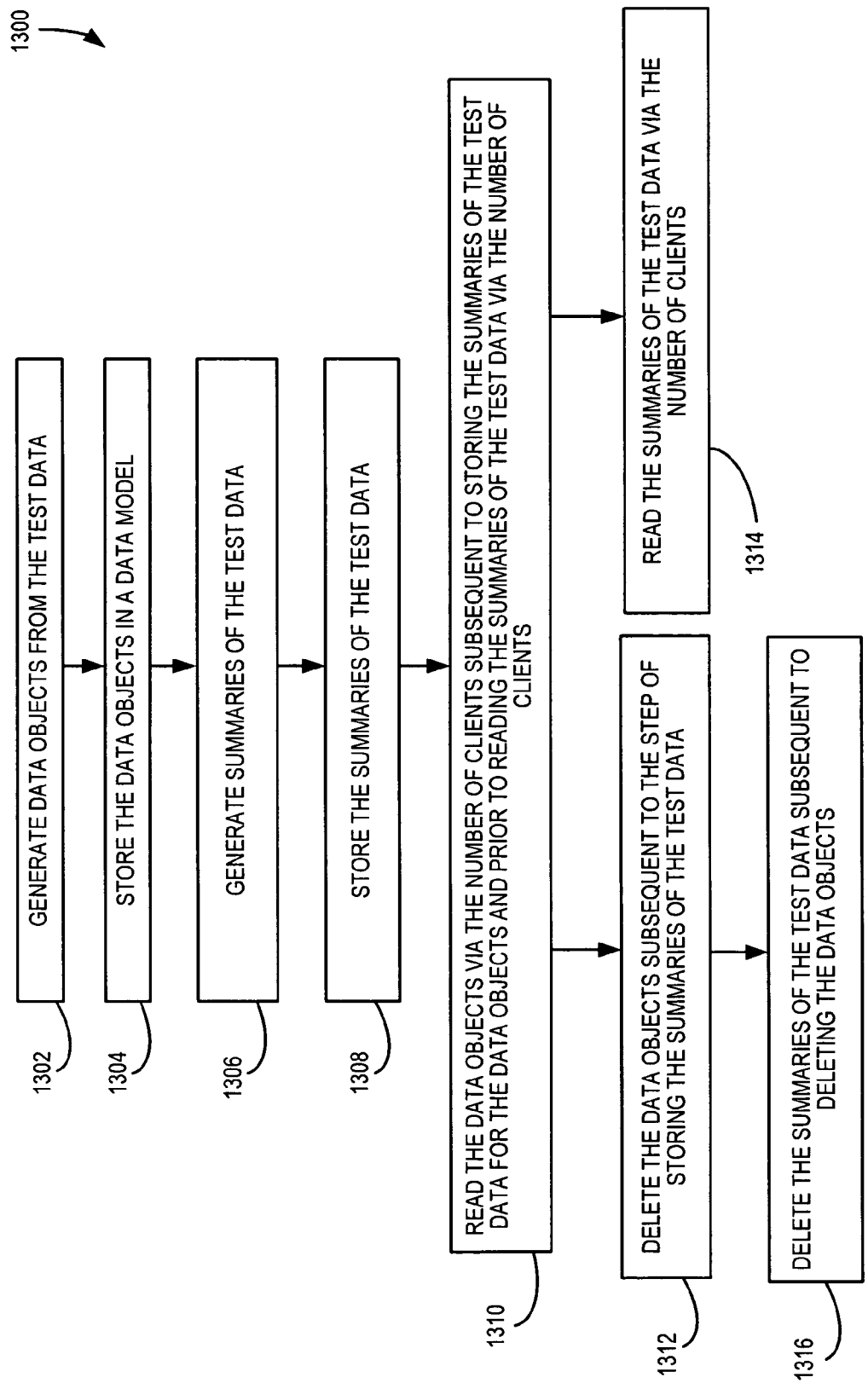

FIG. 13 illustrates another method 1300 of accumulating summaries of test data. In an embodiment, method 1300 may include generating 1302 data objects from the test data. Method 1300 may further include storing 1304 the data objects in a data model. Method 1300 may also include generating 1306 summaries of the test data related to the data objects. Method 1300 may include storing 1308 the summaries of the data objects. Method 1300 may include reading 1310 the data objects with the clients subsequent to storing the summaries of the data objects and prior to reading the summaries of the test data with the clients. Method 1300 may include deleting 1312 the data objects subsequent to the step of storing the summaries of the test data. Method 1300 may include reading 1314 the summaries of the test data with the clients. Method 1300 may include deleting 1316 the summaries of the test data subsequent to deleting the data objects.

Figure 14:
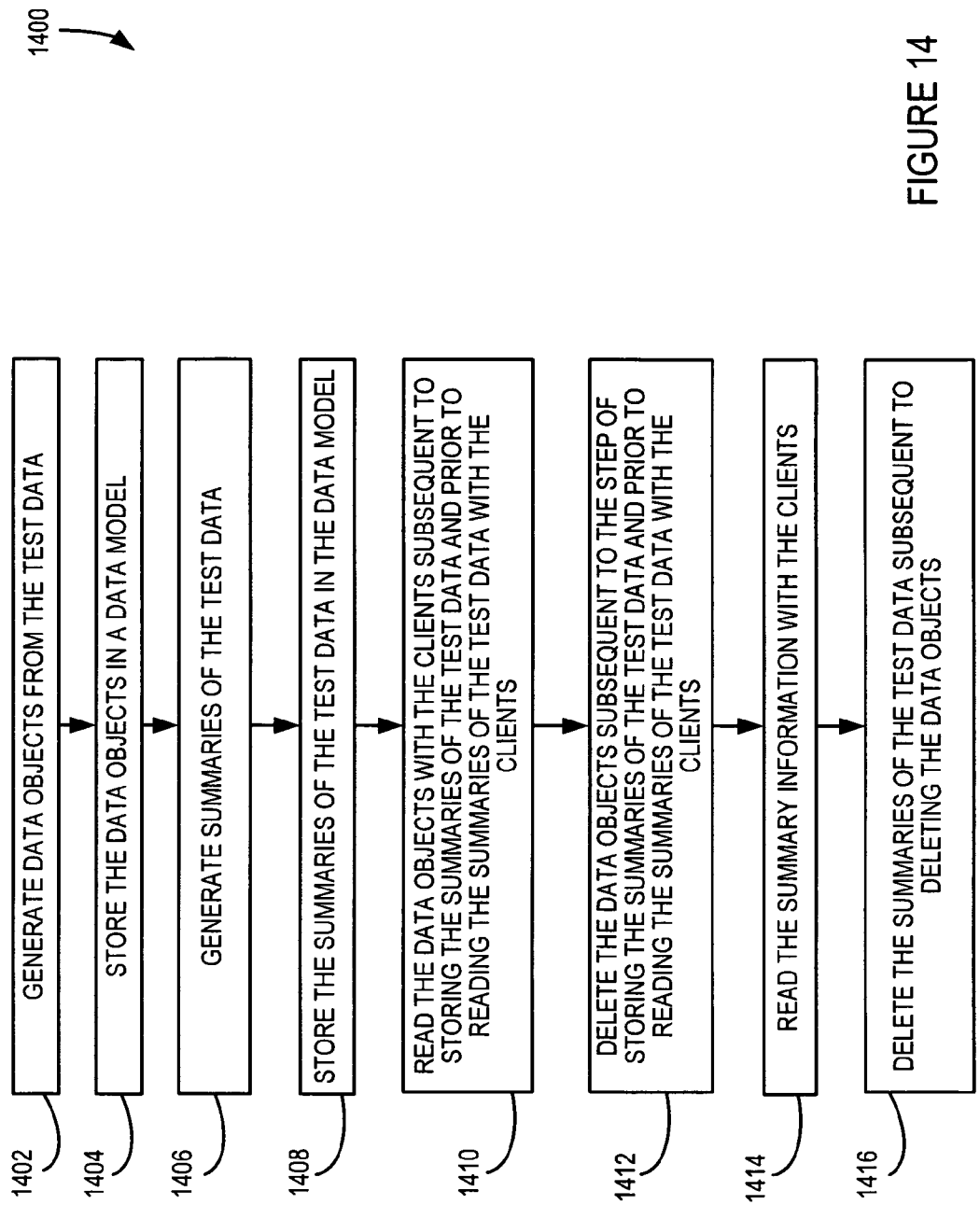

Looking at FIG. 14, there is shown a method 1400 of accumulating summaries of test data. In an embodiment, method 1400 may include generating 1402 data objects from the test data. Method 1400 may further include storing 1404 the data objects in a data model. Method 1400 may also include generating 1406 summaries of test data related to the data objects. Method 1400 may include storing 1408 the summaries of the data objects. Method 1400 may include reading 1410 the data objects with the clients subsequent to storing the summaries of the data objects and prior to reading the summaries of the test data with the clients. Method 1400 may include deleting 1412 the data objects subsequent to the step of storing the summaries of the test data and prior to reading the summaries of the test data via the number of clients. Method 1400 may include reading 1414 the summaries of the test data via the number of clients. Method 1400 may include deleting 1416 the summaries of the test data subsequent to deleting the data objects.

Figure 15:
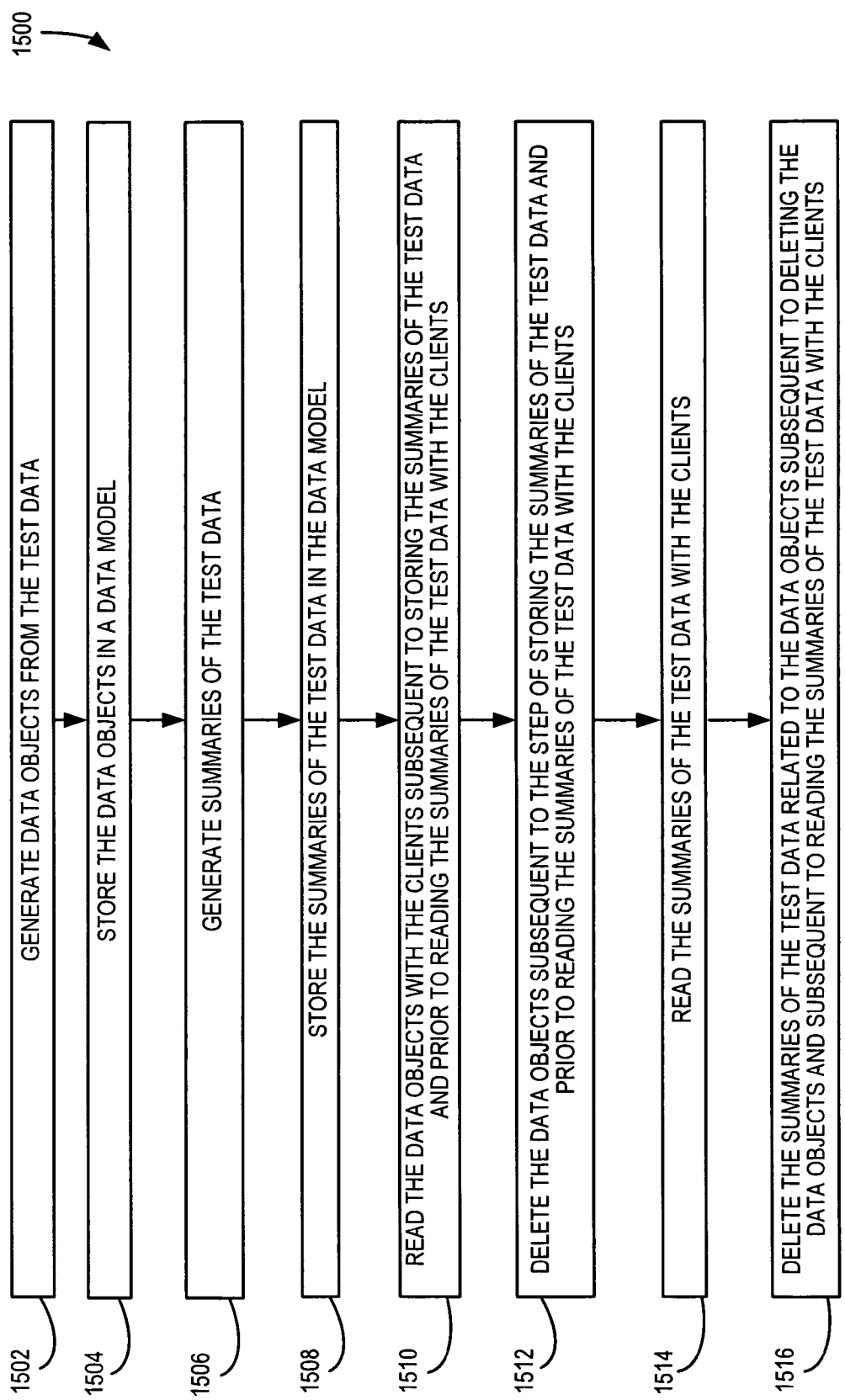

Referring now to FIG. 15, there is shown a method 1500 of accumulating summaries of test data. In an embodiment, method 1500 may include generating 1502 data objects from the test data. Method 1500 may further include storing 1504 the data objects in a data model. Method 1500 may also include generating 1506 summaries of the test data. Method 1500 may include storing 1508 the summaries of the data objects. Method 1500 may include reading 1510 the data objects with the clients subsequent to storing the summaries of the data objects and prior to reading the summaries of the test data via the number of clients. Method 1500 may include deleting 1512 the data objects subsequent to the step of storing the summaries of the test data and prior to reading the summaries of the test data with the clients. Method 1500 may include reading 1514 the summaries of the test data via the number of clients. Method 1500 may include deleting 1516 the summaries of the data objects subsequent to deleting the data objects and to reading the summaries of the test data via the number of clients.

Figure 16:
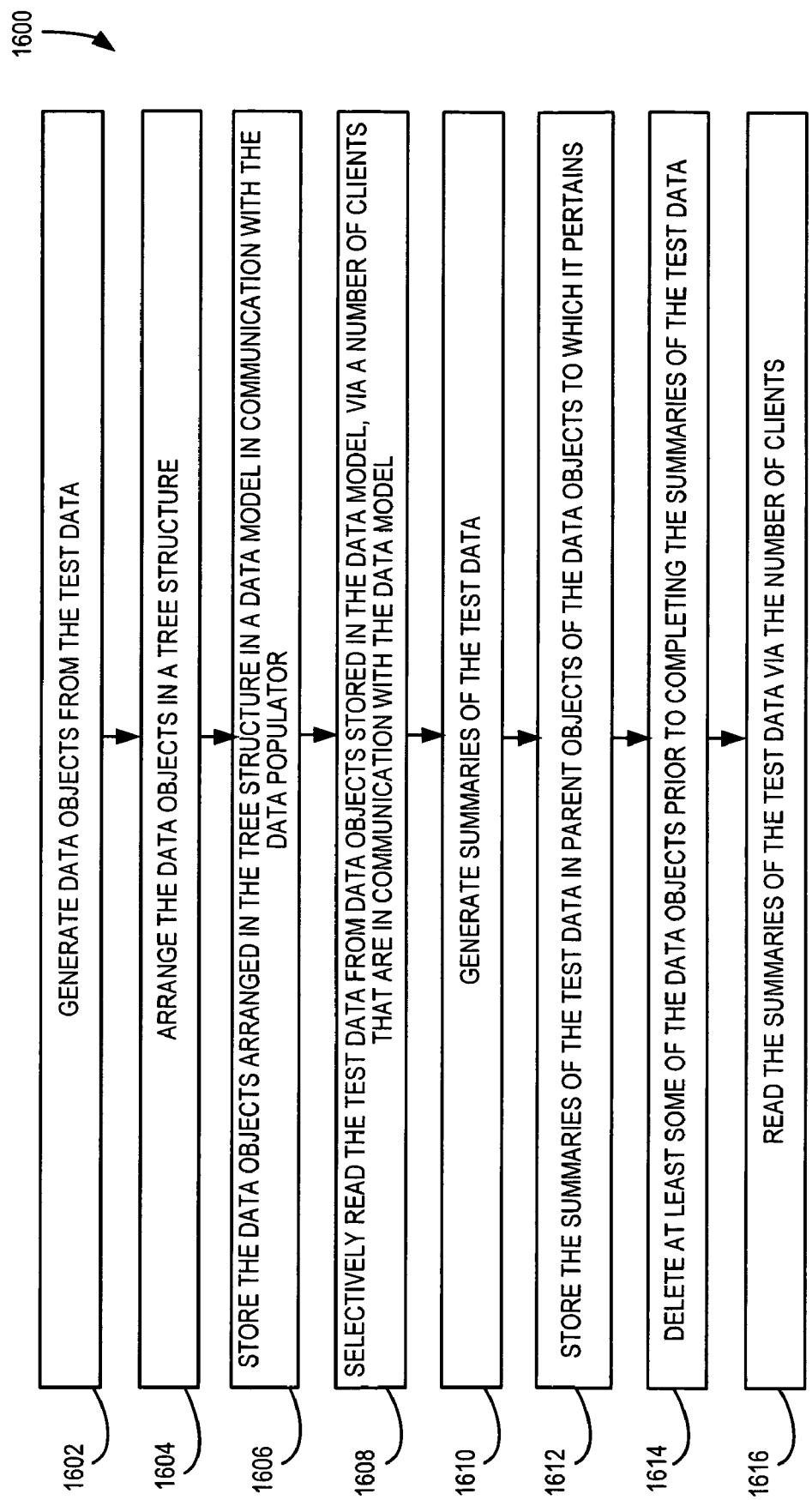

Referring now to FIG. 16, there is shown a method 1600 of accumulating summaries of test data. In an embodiment, method 1600 may include generating 1602 data objects from the test data. Method 1600 may further include arranging 1604 the data objects in a tree structure. Method 1600 may also include storing 1606 the data objects arranged in the tree structure in a data model. Method 1600 may include selectively 1608 reading the test data from the data objects stored in the data model, via a number of clients that are in communication with the data model. Method 1600 may include generating 1610 summaries of the test data. Method 1600 may also include storing 1612 the summaries of the test data in parent objects of the data objects to which it pertains.

Referring still to FIG. 16, and in an embodiment, there is shown a step of deleting 1614 at least some of the data objects prior to completing the summaries of the test data and a step of reading 1616 the summaries of test data via the number of clients.

Figure 17:
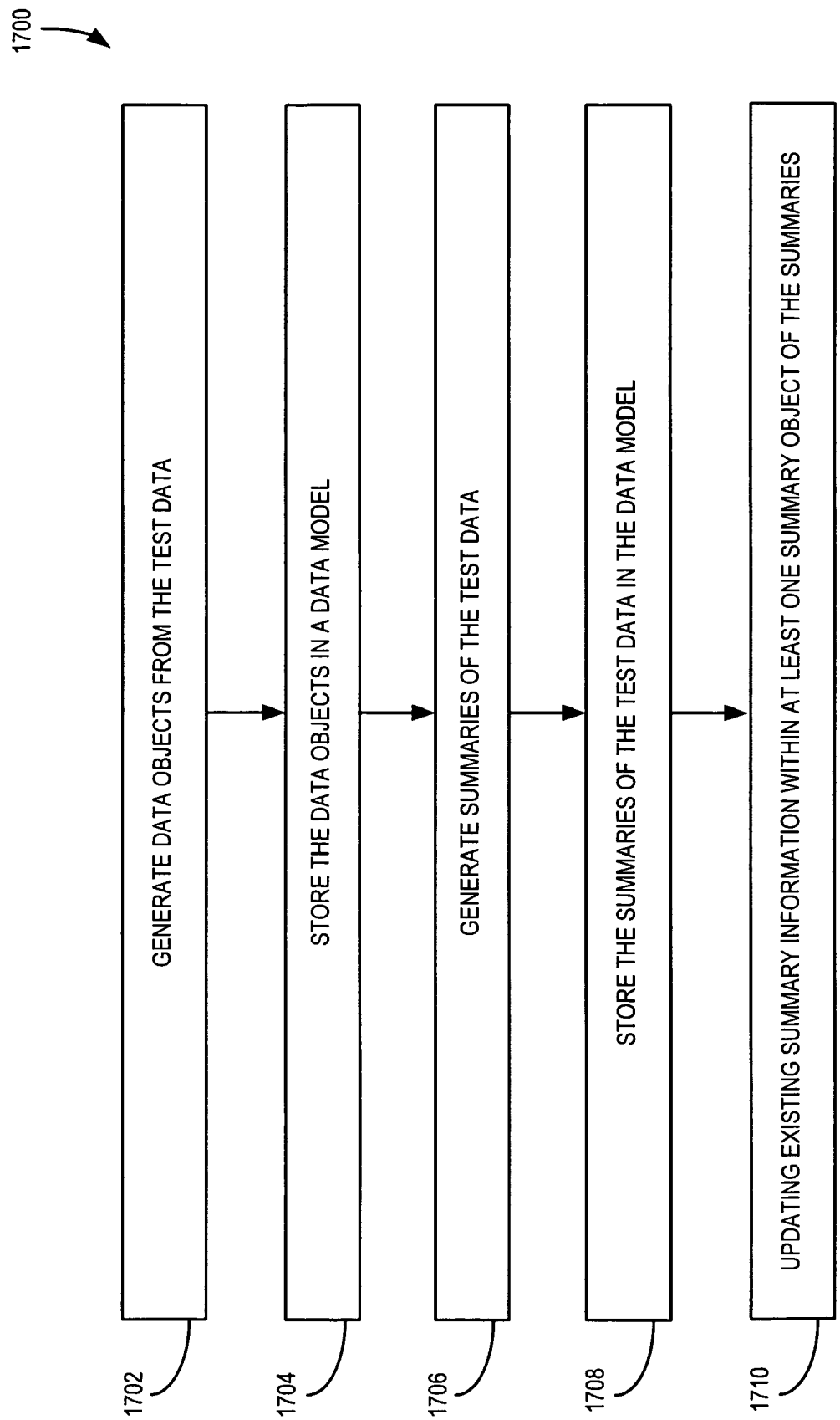

Looking at FIG. 17, and in one embodiment, a method 1700 of accumulating summaries of test data may include updating 1710 existing summary information within at least one summary object of the summaries. This step may be in addition to generating 1702 data objects from the test data, storing 1704 the data objects in a data model, generating 1706 summaries of the test data, and storing 1708 the summaries of the test data in the data model. In other words, prior to deleting the summary object, existing ones of summary objects may be modified. The method may include updating a value of summary information inside existing summary objects as new test results are encountered.

What is claimed is:

1. A system for accumulation of summaries of test data, the system comprising:
    a data populator having code to: (1) generate data objects from the test data, (2) arrange the data objects in a tree structure, (3) store the data objects arranged in the tree structure in a data model, (4) generate summaries of the test data, (5) store the summaries of the test data in the tree structure, in parent objects of the data objects to which the summaries of test data pertain, and (6) delete the data objects; and
    a number of clients in communication with the data model, the clients having code to: (1) selectively read the test data from the data objects stored in the data model, and (2) read the summaries of the test data stored in the tree structure.

2. A system in accordance with claim 1, wherein the data populator generates a summary data object and stores the summaries of the test data in the summary data object.

3. A system in accordance with claim 1, wherein the data populator generates a plurality of summary data objects and stores the summaries of the test data in the plurality of summary data objects.

4. A system in accordance with claim 1, wherein the summaries of the test data include statistical information.

5. A system in accordance with claim 1, wherein the number of clients include a number of data formatters.

6. A system in accordance with claim 5, wherein the data formatters comprise at least one selected from the group consisting of: an STDF writer, an ASCII writer, an XML writer, and an EDL writer.

7. A system in accordance with claim 1, wherein the code for storing the summaries of the test data places the summaries of the test data in at least one of the data objects created by the data populator from the test data.

8. A system in accordance with claim 1, wherein the data populator includes code for deleting the summaries of the test data.

9. A system in accordance with claim 1, wherein the data populator includes code for deleting the data objects prior to completion of the summaries of the test data, and prior to reading of the summaries of the test data by the number of clients.

10. A method of accumulating summaries of test data, the method comprising:
   generating data objects from the test data;
   storing the data objects in a tree structure;
   storing the data objects arranged in the tree structure in a data model;
   providing, to a number of clients that are in communication with the data model, selective reading of the test data from the data objects stored in the data model;
   generating summaries of the test data; and
   storing the summaries of the test data in parent objects of the data objects to which the summaries of the test data pertain.

11. A method in accordance with claim 10, further comprising deleting at least some of the data objects prior to completion of the summaries of the test data.

12. A method in accordance with claim 11, further comprising deleting the summaries of the test data subsequent to deleting the data objects.

13. A method in accordance with claim 10, wherein the selective reading of the test data is provided prior to completion of the summaries of the data objects.

14. A method in accordance with claim 10, wherein the selective reading of the test data is provided prior to the summaries of the test data being read via the number of clients.

15. A method in accordance with claim 14, further comprising, deleting the data objects prior to reading the summaries of the test data via the number of clients.

16. A method of accumulating summaries of test data, the method comprising:
   generating data objects from the test data;
   arranging the data objects in a tree structure;
   storing the data objects arranged in the tree structure in a data model;
   selectively reading the test data from the data objects stored in the data model, via a number of clients that are in communication with the data model;
   generating summaries of the test data; and
   storing the summaries of the test data in parent objects of the data objects to which the summaries of the test data pertain.

17. A method in accordance with claim 16, further comprising:
   deleting at least some of the data objects prior to completing the summaries of the test data; and
   reading the summaries of the test data via the number of clients.

* * * * *